United States Patent [19]

Uchino

[11] Patent Number: 5,572,694
[45] Date of Patent: Nov. 5, 1996

[54] VIRTUAL SYSTEM FOR DETECTING ACCESS PATHS BELONGING TO SAME GROUP FROM PLURALITY OF ACCESS PATHS TO REACH DEVICE DESIGNATED BY COMMAND WITH REFERENCE TO TABLE

[75] Inventor: Minoru Uchino, Kawasaki, Japan

[73] Assignee: Fujitsu Limited, Kawasaki, Japan

[21] Appl. No.: 157,417

[22] Filed: Nov. 26, 1993

[30] Foreign Application Priority Data

Nov. 25, 1992 [JP] Japan .................. 4-314685

[51] Int. Cl.⁶ .................................. G06F 15/02
[52] U.S. Cl. ............. 395/406; 395/858; 364/228.2; 364/251.5; 364/256.3; 364/DIG. 1
[58] Field of Search .................. 395/275, 425, 395/650, 700, 800, 406, 858

[56] References Cited

U.S. PATENT DOCUMENTS

| 4,396,984 | 8/1983 | Videki, II | 395/858 |
| 4,831,541 | 5/1989 | Eshel | 395/146 |
| 5,361,375 | 11/1994 | Ogi | 395/800 |
| 5,371,857 | 12/1994 | Takagi | 395/733 |
| 5,392,409 | 2/1995 | Umeno et al. | 395/406 |

FOREIGN PATENT DOCUMENTS

63-178359  7/1988  Japan .

*Primary Examiner*—Thomas C. Lee
*Assistant Examiner*—Moustafa Mohamed Meky
*Attorney, Agent, or Firm*—Staas & Halsey

[57] ABSTRACT

In a format such that a plurality of input/output devices are allocated to a plurality of virtual machines in a one-to-one corresponding manner, a group ID issued from each of the virtual machines is held into a table every plurality of access paths which reach a plurality of input/output devices via a plurality of channel devices and an input/output control unit. When an input/output command issued from the virtual machine is received, the access paths belonging to the same group are detected from among a plurality of access paths which reach the input/output device which executes a command with reference to the table and the input/output operations are executed. Even in a format such that one disk unit is commonly used by a plurality of virtual machines, since the disk control unit can recognize the plurality of virtual machines, an exclusive control is executed without needing the use of a monitor section.

27 Claims, 10 Drawing Sheets

| VIRTUAL MACHINE | ALLOCATION MAGNETIC DISK DEVICE |
|---|---|
| VM10-1 | DEV-1 |
| VM10-2 | DEV-2 |

FIG. 6

| CHANNEL ADAPTER | PATH | SET GROUP ID | |
|---|---|---|---|
| CA1 | 111 | A | ← GROUP FORMATION |
| | 112 | B | ← GROUP FORMATION |
| | ⋮ | ⋮ | |
| CA2 | 221 | A | ← |
| | 222 | B | ← |
| | ⋮ | ⋮ | |

| VIRTUAL MACHINE | ALLOCATION DISK UNIT |
|---|---|
| VM10-1 | DEV-1 |
| VM10-2 | DEV-1 |

FIG. 13

| CHANNEL ADAPTER | PHYSICAL ACCESS PATH | LOGICAL ACCESS PATH | GROUP ID | PRIVATE FLAG |
|---|---|---|---|---|
| CA1 | 111 | 1111 | A | 1 |
| | | 2111 | B | 0 |
| CA2 | 221 | 1221 | A | 1 |
| | | 2221 | B | 0 |

GROUP FORMATION
GROUP FORMATION

VIRTUAL SYSTEM FOR DETECTING ACCESS PATHS BELONGING TO SAME GROUP FROM PLURALITY OF ACCESS PATHS TO REACH DEVICE DESIGNATED BY COMMAND WITH REFERENCE TO TABLE

BACKGROUND OF THE INVENTION

The invention relates to input/output control method and apparatus of a virtual machine system which can make different operating systems operative in a plurality of virtual machines which operate on a computer and, more particularly, to input/output control method and apparatus of a virtual machine system for allocating a special one of input/output devices such as a plurality of magnetic disk units or the like to a virtual machine and for executing input/output controls.

In the case where a disk control unit is commonly used by virtual machines which are realized by a plurality of OS and a plurality of input/output devices which are under the domination of the disk control unit, for example, magnetic disk units (hereinafter, simply referred to as "disk units") are allocated to a special virtual machine in a one-to-one corresponding relation and input and output operations are executed, an overhead of the virtual machine system increases and the performance deteriorates.

On the other hand, in the case where one disk unit which are under the domination of the disk control unit are commonly used by a plurality of virtual machines, when a physical access path is specially allocated to only each of the virtual machines, the virtual machines which are commonly used are limited in dependence on the number of physical access paths. There is, accordingly, a method of allocating one physical access path to a plurality of virtual machines.

When one physical access path is allocated to a plurality of virtual machines, however, it is necessary to perform input/output controls to allow the disk control unit and the physical access path to be commonly used by a plurality of virtual machines. An overhead of the virtual machine system increases and the performance deteriorates.

Further, since the disk control unit is constructed on the assumption that the input/output controls are inherently executed by one OS, in the case where it is subjected to the controls by a plurality of virtual machines, the function of the multi access path to improve the performance and the reliability cannot be used. It is demanded to improve such a point.

In the conventional virtual machine system, the disk control unit is connected to a main storage control unit of a main storage unit through a channel device and a plurality of disk units are connected under the domination of the disk control unit.

In this case, a plurality of disk control units can be connected to one channel device. A plurality of disk units can be connected to one disk control unit.

Figure 1:
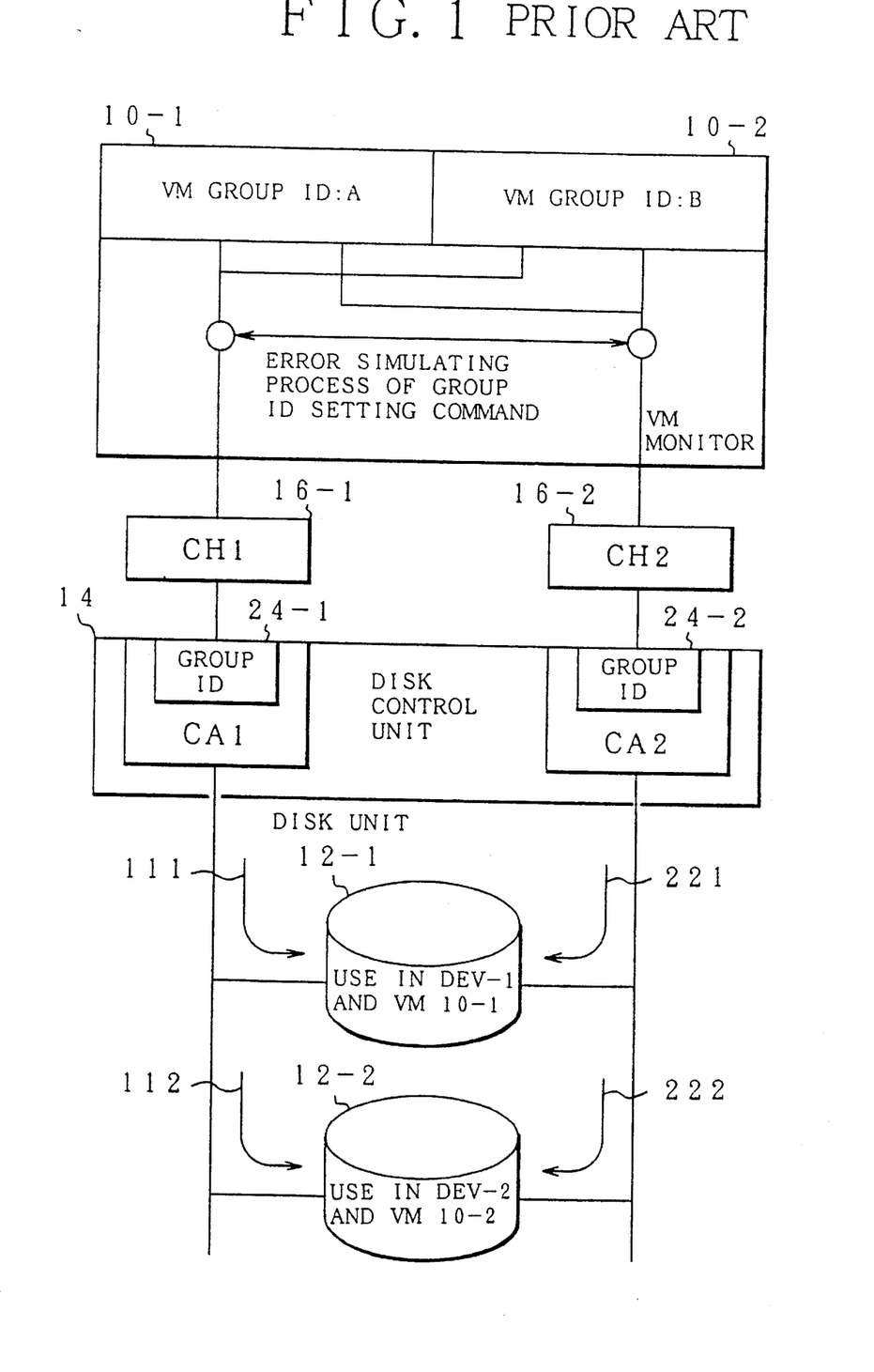
FIG. 1 is an explanatory diagram of conventional input/output controls in which disk units are allocated to virtual machines in a one-to-one corresponding manner.

FIG. 1 shows an example of an input/output subsystem in the conventional virtual machine system. In such a system, a plurality of disk units 12-1 and 12-2 are connected under the domination of one disk control unit 14 via two paths. Two channel devices 16-1 and 16-2 are provided in correspondence to virtual machines 10-1 and 10-2 on a main storage unit. The channel devices 16-1 and 16-2 are connected to channel adapters 24-1 and 24-2 of the disk control unit 14. In order to access the disk unit 12-1 or 12-2, the access route certainly passes through the channel device 16-1 or 16-2 and the disk control unit 14 and such a logical coupling path is called an access path. The access path is expressed together with the ID No. (identification number) added to each device.

For example, now assuming that the numbers of the channel devices 16-1 and 16-2 are set to CH1 and CH2 and the channel adapter numbers of the disk control unit 14 are set to CA1 and CA2 and the numbers of the disk units 12-1 and 12-2 are set to DEV-1 and DEV-2, they are expressed by access paths 111, 112, 221 and 222 and denote the following paths.

| [access path] | [path] |
| --- | --- |
| 111 | CH1~CA1~DEV-1 |
| 112 | CH1~CA1~DEV-2 |
| 221 | CH2~CA2~DEV-1 |
| 222 | CH2~CA2~DEV-2 |

In case of making the virtual machine system operative by using the input/output construction shown in FIG. 1, there is a form such that the disk units 12-1 and 12-2 under the domination of the disk control unit 14 are allocated to the virtual machines 10-1 and 10-2 in a one-to-one corresponding relation.

In FIG. 1, since the disk unit 12-1 is allocated to the virtual machine 10-1, the access paths 111 and 221 can be used by the virtual machine 10-1. Since the disk unit 12-2 is allocated to the virtual machine 10-2, the access paths 112 and 222 can be used by the virtual machine 10-2.

In case of such a form in which the virtual machine and the disk unit are allocated in a one-to-one corresponding manner, the disk control unit 14 and the channel devices 16-1 and 16-2 are commonly used between a plurality of guest virtual machines 10-1 and 10-2, so that there is an effect from a viewpoint of the effective use of resources.

As a disk control unit 14, there is a disk control unit having a dynamic path recoupling function and an expansion reserving function in order to improve the performance and reliability. As for the dynamic path recoupling function, a recoupling or the like after completion of the seeking operations of the disk units 12-1 and 12-2 is executed from a blank access path, thereby enabling an input/output response time to be reduced, so that the performance is improved. As for the expansion reserving function, when a trouble occurs while the OS is reserving the disk unit 12-1 or 12-2, it is possible to access to the disk unit 12-1 or 12-2 by using another channel, so that the reliability is improved.

To use those functions, it is necessary to form a group by a plurality of access paths for the disk units 12-1 and 12-2. That is, it is sufficient that a point that a plurality of access paths via the disk control unit 14 are used by only one system (one OS) is declared to the disk control unit 14 by a form of the group formation. For example, in the case where the virtual machine 10-1 uses the dynamic path recoupling function and expansion reserving function, the operating system which operates on the virtual machine 10-1 issues a group ID setting command every two access paths 111 and 221 of the disk unit 12-1 allocated to the virtual machine, the same group ID is held in the channel adapters 24-1 and 24-2 of the disk control unit 14, thereby forming a group of the two access paths 111 and 221 for the disk unit 12-1.

Figure 2:
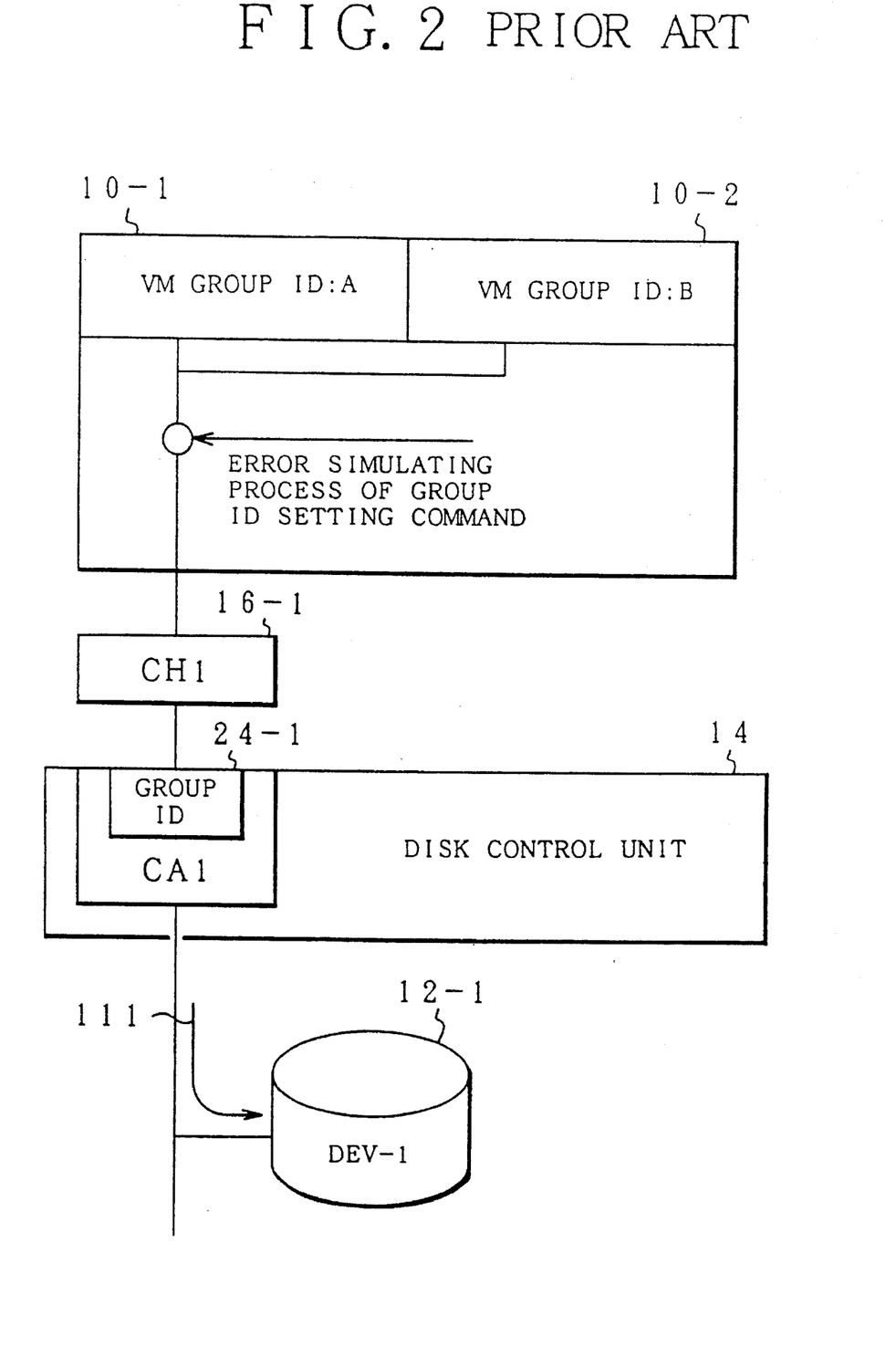
FIG. 2 is an explanatory diagram of conventional input/output controls in which one disk unit is commonly used by a plurality of virtual machines.

FIG. 2 shows a form such that the channel device 16-1, disk control unit 14, and disk unit 12-1 are allocated to the two virtual machines 10-1 and 10-2 and are commonly used. In this case, the access path 111 for the disk unit 12-1 is used by the virtual machines 10-1 and 10-2 and one access path can be commonly used among a plurality of virtual machines, so that there is an effect from a viewpoint of the effective use of resources.

With respect to the form shown in FIG. 2, in a manner similar to the case of FIG. 1, the dynamic path recoupling function and the expansion reserving function are provided for the disk control unit 14 for the purpose of the improvement of the performance and reliability.

However, in an input/output form such that the disk units are allocated to the virtual machines shown in FIG. 1 in a one-to-one corresponding manner and one disk control unit is commonly used by a plurality of virtual machines, there is a problem such that the dynamic path recoupling function and the expansion reserving function which need to form a group of access paths cannot be used. This is because the disk control unit inherently operates on the assumption that an instruction by a channel command word from the channel device is given from one system (one OS), so that the channel command words from a plurality of virtual machines 10-1 and 10-2 as shown in FIG. 1 cannot be distinguished.

In the conventional virtual machine system, therefore, there is used a method whereby in order to prevent that group ID setting commands are generated from a plurality of virtual machines upon activation of the system and the subsequent input/output operations cannot be assured, a monitor program (hereinafter, referred to as a "monitor section") as a software to realize a virtual machine onto a real machine intercepts all of input/output commands which are issued from the virtual machines and simulates the group ID setting commands in the input/output request as errors, thereby rejecting a group forming command.

According to the simulation such that the group ID setting command in the input/output request is set to an error, when the virtual machine issues the input/output command, the monitor unit monitors whether the command is a group ID setting command or not, and when the group ID setting command is detected, the command is rejected.

In the form such that one disk control unit is commonly used by a plurality of virtual machines, consequently, the dynamic path recoupling function and the expansion reserving function which need to form a group of access paths cannot be used, resulting in deterioration of the performance and reliability.

Further, since the monitor section performs an intersection to the I/O command to reject the group ID setting command by the error simulation, there is a problem such that the overhead of the monitor unit increases and the deterioration of the performance is promoted.

On the other hand, in the input/output form such that one disk unit is commonly used by a plurality of virtual machines as shown in FIG. 2, since there is a case where input/output requests are simultaneously issued from the virtual machines 10-1 and 10-2, a function to perform an exclusive control is provided for the disk control unit 14.

Since the disk control unit 14, however, operates on the assumption that an instruction by the channel command word from the channel device 16-1 is given from one system (one OS), when one access path is commonly used by a plurality of systems (a plurality of OS), the exclusive control cannot be executed.

In the conventional system, therefore, in order to simulate an exclusive control command by the monitor section in place of the disk control unit 14, it is necessary to intercept the input/output command and the input/output interruption, so that there is a problem such that the overhead of the monitor section increases and the deterioration of the performance is promoted.

Since the above form is such that one disk unit is commonly used by a plurality of virtual machines in a manner similar to the form of FIG. 1, the dynamic path recoupling function and expansion reserving function which need to form a group of access paths cannot be used, resulting in deterioration of the performance and reliability.

SUMMARY OF THE INVENTION

According to the invention, there are provided input/output control method and apparatus of a virtual machine system in which an input/output control unit can recognize a plurality of virtual machines.

First, according to the invention, a plurality of virtual machines are realized onto a real machine by a monitor unit (monitor program) as a software to control a virtual machine system. A plurality of input/output devices are allocates to a plurality of virtual machines in a one-to-one corresponding manner, respectively. The input/output control unit connects each of a plurality of input/output devices by physical access paths of at least two systems. The input/output control unit is connected to a plurality of virtual machines by at least two channel devices.

In the form such that the input/output units are allocated to a plurality of virtual machines in a one-to-one corresponding manner as mentioned above, a group ID holding section, a clearing section, and an input/output executing section are provided for the input/output control unit. The group ID holding section of the input/output control unit holds a table in which a group ID issued from each virtual machine every plurality of access paths which reach the individual input/output units via a plurality of virtual machines, a plurality of channel units, and input/output control unit. The clearing section clears a special one of the group IDs set in the table of the group ID holding section. When the input/output command issued from each of a plurality of virtual machines is accepted, the input/output executing section detects the access paths which belong to the same group from among a plurality of access paths reaching the input/output unit with reference to the table of the group ID holding section and forms a group of the access paths and executes the input/output with the virtual machines.

On the basis of the result of the allocation of a plurality of input/output units by the monitor unit, the group ID holding section of the input/output control unit activates the virtual machines and is subjected to the setting of the group ID by the group ID setting process of the operating system (OS) which operates on the virtual machine.

The clearing section of the input/output control unit clears the special group ID by an instruction of the monitor section. For example, when the allocation of a plurality of input/output units to a plurality of virtual machines is changed, the monitor section instructs the clearing process to the clearing section of the input/output control unit in order to clear the group ID used by each virtual machine.

The input/output control unit has a plurality of channel adapters to couple with a plurality of channel devices and a table to set the group ID is provided for every channel adapter. The input/output executing section of the input/output control unit 14 executes the input/output process by using the access paths which belong to the same group designated by the group ID obtained from the table of the group ID holding section. Further, the input/output device is a disk unit and the input/output control unit is a disk control unit.

According to the invention, since a special kind of group ID issued by a plurality of virtual machines can be set into the input/output control unit every access path for the input/output unit, the channel command words which are given from the channel devices in accordance with the input/output commands of a plurality of virtual machines can be distinguished by the disk control unit. Therefore, a group in which two access paths exist can be formed in the form such that the disk units are allocated to the virtual machines in a one-to-one corresponding manner.

By the above group formation, the dynamic path recoupling function is realized and the access path when, for example, the disk unit is activated and disconnected by the input/output command and is again recoupled after completion of the seeking operation can be efficiently assured and the input/output response time can be reduced.

On the other hand, the expansion reserving function can be realized. When a trouble occurs while the virtual machine is reserving the disk unit, it is possible to access by using another channel and the reliability can be improved.

According to a modification of the invention, there are provided input/output control method and apparatus of a virtual machine system in which in the case where one input/output device is commonly used by a plurality of virtual machines, an input/output control unit recognizes a plurality of virtual machines and an exclusive control can be performed without needing the use of a monitor section.

The modified invention is based on a form in which one input/output device is commonly used by a plurality of virtual machines as a prerequisite. That is, a plurality of virtual machines which are realized on a real machine by the monitor section of the virtual machine is connected to one input/output device through the channel devices and input/output control device via a plurality of logical access paths and one physical access path.

With respect to the form in which one input/output device is commonly used by a plurality of virtual machines as mentioned above, a group ID holding section, a clearing section, and input/output executing section, and an exclusive control section are provided for the input/output control unit of the modified invention. The group ID holding section converts a plurality of logical access paths which are indicated by the input/output commands from a plurality of virtual machines into a single physical access path and holds a group ID set by each virtual machine into a table every plurality of logical access paths which start from the virtual machines and reach the input/output devices. The clearing section clears the special group ID held in the table of the group ID holding section. When the input/output command issued from either one of the virtual machines is accepted, the exclusive control section converts the logical access paths into the physical access path with reference to the table of the group ID holding section and controls the competition of the accesses. Further, the input/output executing section executes the input/output command to the input/output device on the basis of the result of the control of the exclusive control section.

Therefore, even in the form such that one input/output device is commonly used by a plurality of virtual machines, the input/output control unit can recognize a plurality of virtual machines and can execute the exclusive control without needing the use of the monitor section. Further, a group in which two access paths exist can be also formed.

Even in the form such that one input/output device is commonly used by a plurality of virtual machines, the dynamic path recoupling function is realized by the group formation. The access path when, for example, the disk unit is activated and is disconnected by the input/output command and is again coupled after completion of the seeking operation can be efficiently assured and the input/output response time can be reduced.

The expansion reserving function can be realized and when a trouble of a channel occurs while the virtual machine is reserving the disk unit, it is possible to access by using another channel. The reliability can be improved.

The above and other objects, features, and advantages of the present invention will become more apparent from the following detailed description with reference to the drawings.

DETAILED DESCRIPTION OF THE PREFERRED EMBODIMENT

Figure 3:
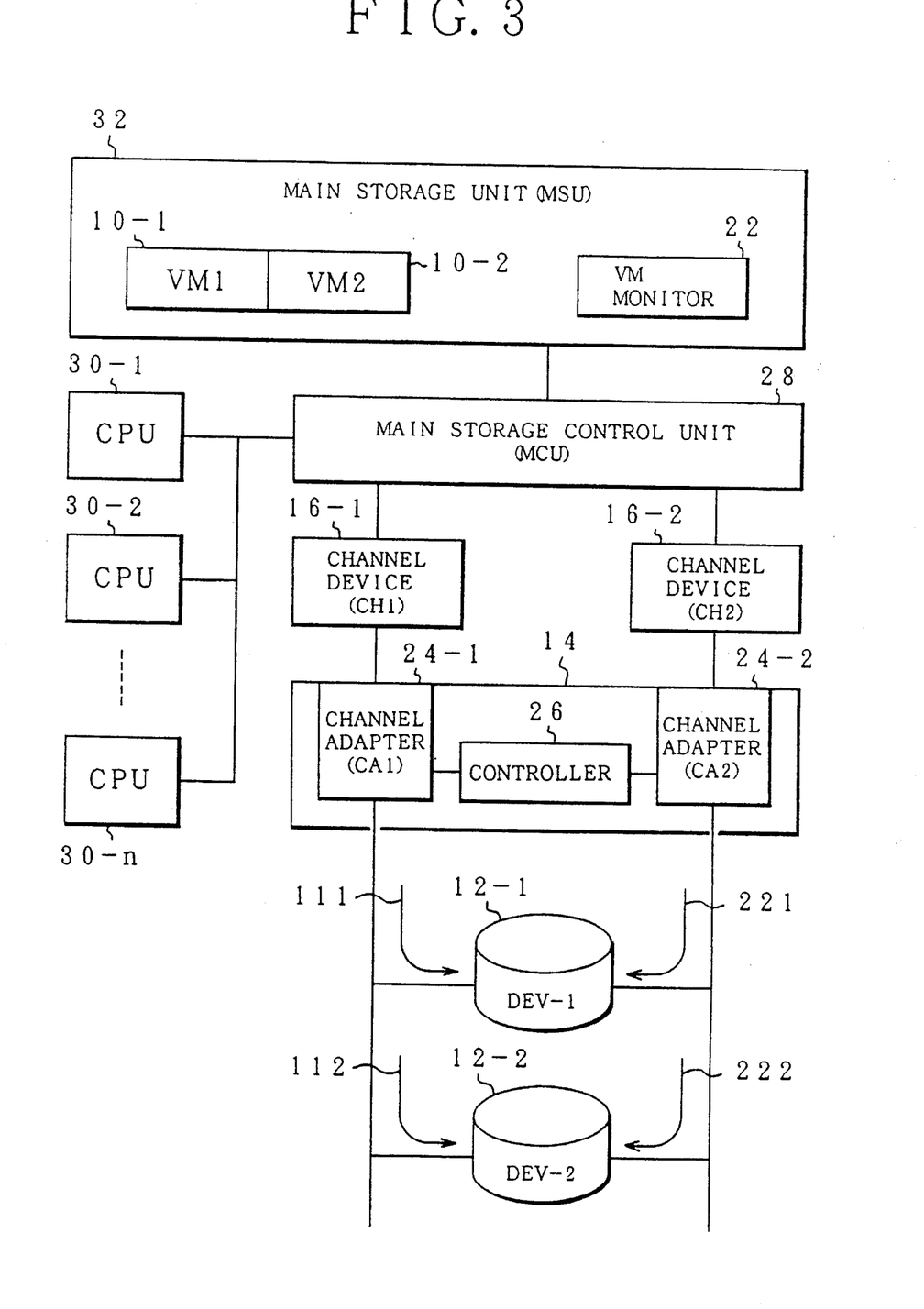
FIG. 3 is a block diagram showing a hardware construction of the invention.

FIG. 3 shows a hardware construction of a virtual machine system to which the input/output controls of the invention are applied. A monitor program 22 (hereinafter, referred to as a "monitor section 22") to control the virtual machine system and a plurality of virtual machines 10-1 and 10-2 which are realized on a real machine by the monitor section 22 and in each of which the independent OS is executed are provided in a main storage unit (MSU) 32. A main storage control unit (MCU) 28 is connected to the main storage unit 32. The MSU 32 is subjected to a store access and a load access through the MCU 28. A plurality of CPUs 30-1 to 30-n are connected to the MCU 28, thereby constructing a multiprocessor system. The MCU 28 executes the OS of the virtual machines 10-1 and 10-2, the monitor section 22, and the like by a dispatching function of the monitor section 22 to perform the CPU allocation. One disk control unit 14 is connected to the MCU 28 through the channel devices 16-1 and 16-2. A plurality of disk units 12-1 and 12-2 are connected under the domination of the disk control unit 14 via the paths of two systems. The channel adapters 24-1 and 24-2 are provided for the disk control unit 14 every channel devices 16-1 and 16-2. The input/output controls are executed to the channel adapters 24-1 and 24-2 by a controller 26 using a CPU.

In FIG. 3, two channel devices 16-1 and 16-2 are shown with respect to one disk control unit 14 for simplicity of explanation. However, for instance, up to sixteen channel devices can be provided. For example, up to 1024 channel devices can be provided for the main storage control unit 28, so that a plurality of disk control units are also provided. Further, although FIG. 3 shows the case where two disk units 12-1 and 12-2 are connected to the disk control unit 14, for example, up to sixteen disk units can be connected.

As a hardware to construct such a virtual machine system, for example, there is M-780 series or M-1800 series made by Fujitsu Ltd..

Figure 4:
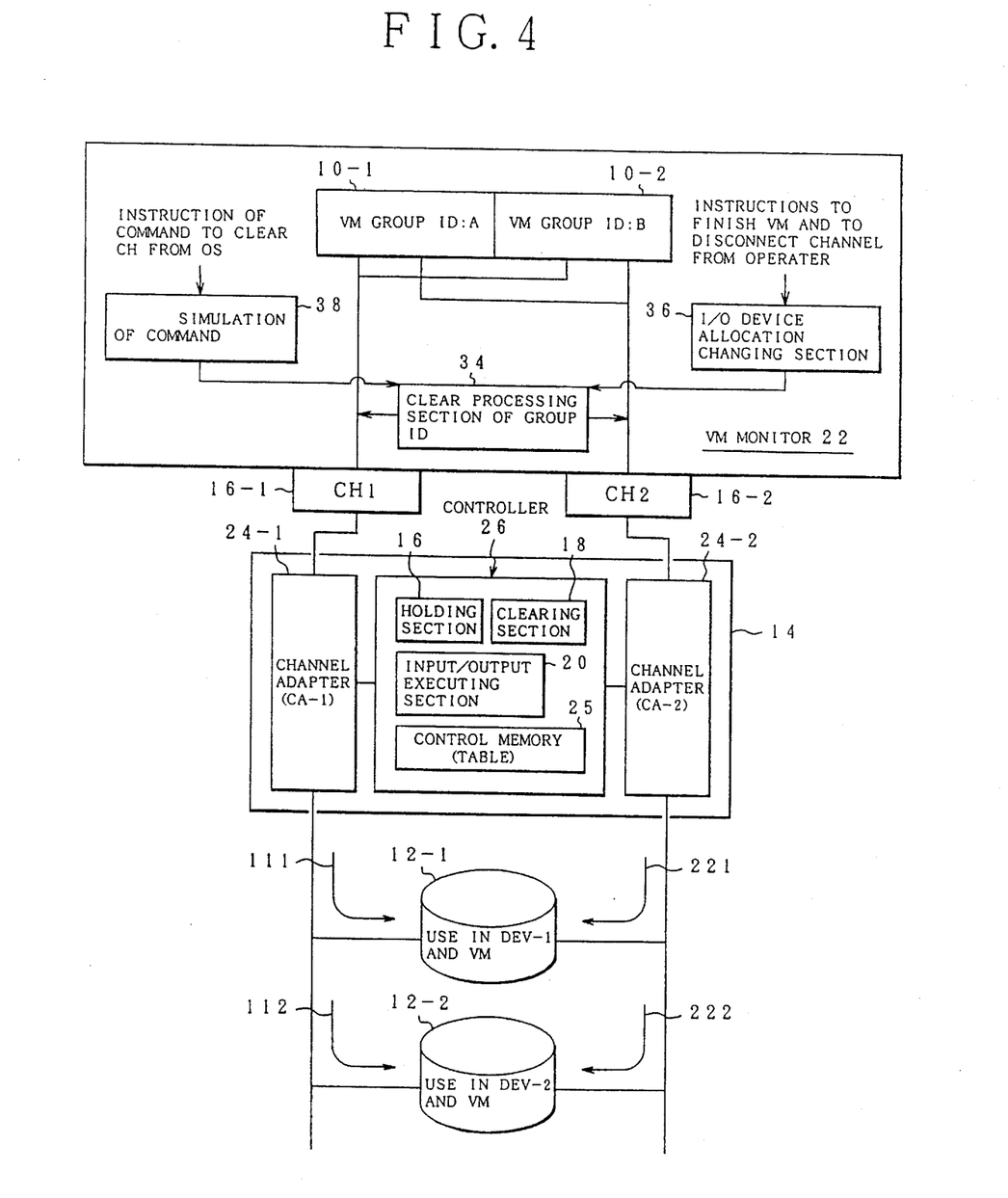
FIG. 4 is an explanatory diagram showing a processing function of input/output controls according to the invention.

FIG. 4 shows a processing function of the input/output controls according to the invention. The virtual machines 10-1 and 10-2 and monitor section 22 which are realized by a software are shown together with a hardware of the channel devices 16-1 and 16-2, disk control unit 14, and disk units 12-1 and 12-2. The disk control unit 14 has the controller 26 and the channel adapters 24-1 and 24-2. The controller 26 is a kind of processing apparatus having functions as a group ID holding section 16, a clearing section 18, and an input/output executing section 20. Further, the controller 26 has a control memory 25 to develop a table whose contents are managed by the group ID holding section 16.

A table in which group IDs have been set by the group ID holding section 16 is held in the control memory 25. First, in the invention, as logical access paths which start from the virtual machines 10-1 and 10-2 and reach the disk units 12-1 and 12-2 via the channel devices 16-1 and 16-2 and the disk control unit 14, the access paths (111 and 112) and (221 and 222) of the number as many as the number of channel devices, namely, two devices are defined with respect to each of the disk units 12-1 and 12-2. On the basis of such a definition of the access paths, the group ID issued from each of the virtual machines 10-1 and 10-2 is set into the table held in the control memory 25 by the group ID holding section 16.

The clearing section 18 clears a special one of the group IDs stored in the table in the control memory 25 by the group ID holding section 16. Further, when input/output commands issued from the virtual machines 10-1 and 10-2 are received, the input/output executing section 20 detects at least two access paths belonging to the same group by referring to the table in the control memory 25 by the group ID holding section 16. The input/output executing section 20 forms a group by those two access paths and executes the input/output operations with the virtual machines 10-1 and 10-2.

The functions which are realized by the disk control unit 14 will now be described as follows further in detail.

Table holding function

Figure 5:
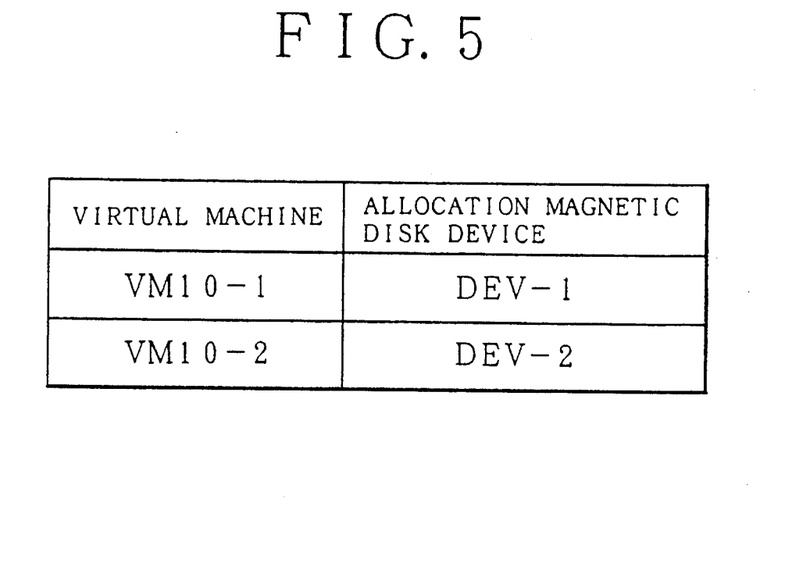
FIG. 5 is an explanatory diagram of the allocation of disk units to virtual machines according to the invention.

A table holding function to enable a plurality of group IDs to be held by the group ID holding section 16 and control memory 25 of the disk control unit 14 is realized. Specifically speaking, it is enabled to hold one group ID every access path for the disk units 12-1 and 12-2. For example, as shown in FIG. 5, it is now assumed that the disk unit 12-1 of the number DEV-1 has been allocated to the virtual machine 10-1 and the disk unit 12-2 of the number DEV-2 has been allocated to the virtual machine 10-2. It is also assumed that the group ID of the virtual machine 10-1 is set to A and the group ID of the virtual machine 10-2 is set to B.

Figure 6:
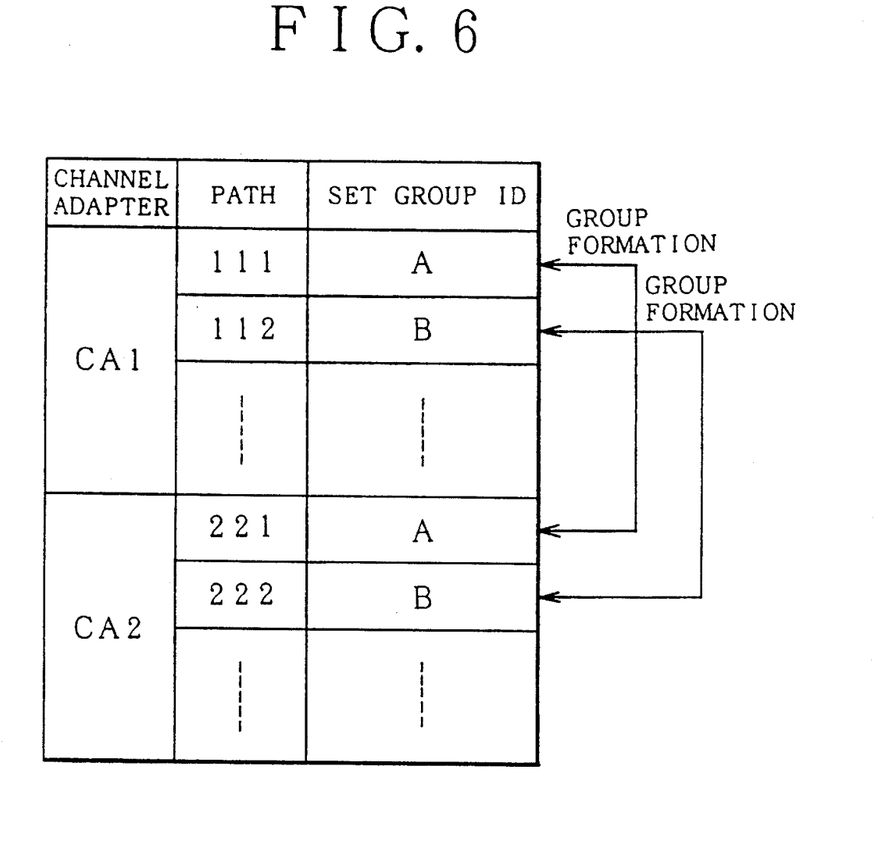
FIG. 6 is an explanatory diagram of a table showing the correspondence between the access paths and the group IDs which is held in a disk control unit of the invention.

As shown in FIG. 6, in this case, in the table shown by the numbers CA1 and CA2 of the channel adapters 24-1 and 24-2 of the disk control unit 14, the group ID=A is held for the access paths 111 and 221 and the group ID=B is held for the access paths 112 and 222.

Group forming function

In the set group IDs, a group is formed by regarding that the access paths in which the same group ID has been set as the same group. In case of FIG. 6, one group is formed by the set of the same group ID=A which the two access paths 111 and 221 for the disk unit 12-1 allocated to the virtual machine 10-1 have. Another one group is formed by the set of the same group ID=B which the two access paths 112 and 222 for the disk unit 12-2 allocated to the virtual machine 10-2 have.

Group setting Error Notifying Function

When the group ID has already been set into a certain access path, an error response is generated for a setting request of a different group ID.

Making the Input/Output Function Effective by Group Formation

When channel command words according to the input/output commands from the virtual machines 10-1 and 10-2 are received, the access paths in which a group having the same group ID was formed are recognized and the input/output functions which are realized by the group formation are made effective. As input/output functions which are made effective by the group formation, there are (1) the dynamic path recoupling function and (2) the expansion reserving function as mentioned above.

Clearing Function

A group ID clearing command which can clear a special group ID is provided and, when the monitor section 22 issues the group ID clearing command, the group ID designated by the command is selected from among a plurality of group IDs which have already been set and is cleared. When the group ID is cleared by the group ID clearing command, the system is returned to the initial state in which no group ID is set.

The other functions of the disk control unit 14 operate without being influenced by the installation of the above functions.

To realize the input/output controls of the invention, a function of a clear processing section 34 is newly added to the monitor section 22. When the following conditions are obtained, the clear processing section 34 clears the special set group ID every channel adapters 24-1 and 24-2.

Condition 1

In the case where the disk control unit 14 allocated to the virtual machines 10-1 and 10-2 is removed from the allocation targets, the special set group ID is cleared. Specifically speaking, when the end of virtual machines 10-1 and 10-2 is instructed to an I/O device allocation changing section 36 by the operator, or when the detachment of the channel or disk unit is instructed from the virtual machines 10-1 and 10-2, the special set group ID is cleared.

Condition 2

When the clear instructing command to reset the channel device is received by the I/O command which is issued by the OS on the virtual machine system to a simulating section 38 of the command, the special set group ID is cleared.

Figure 7:
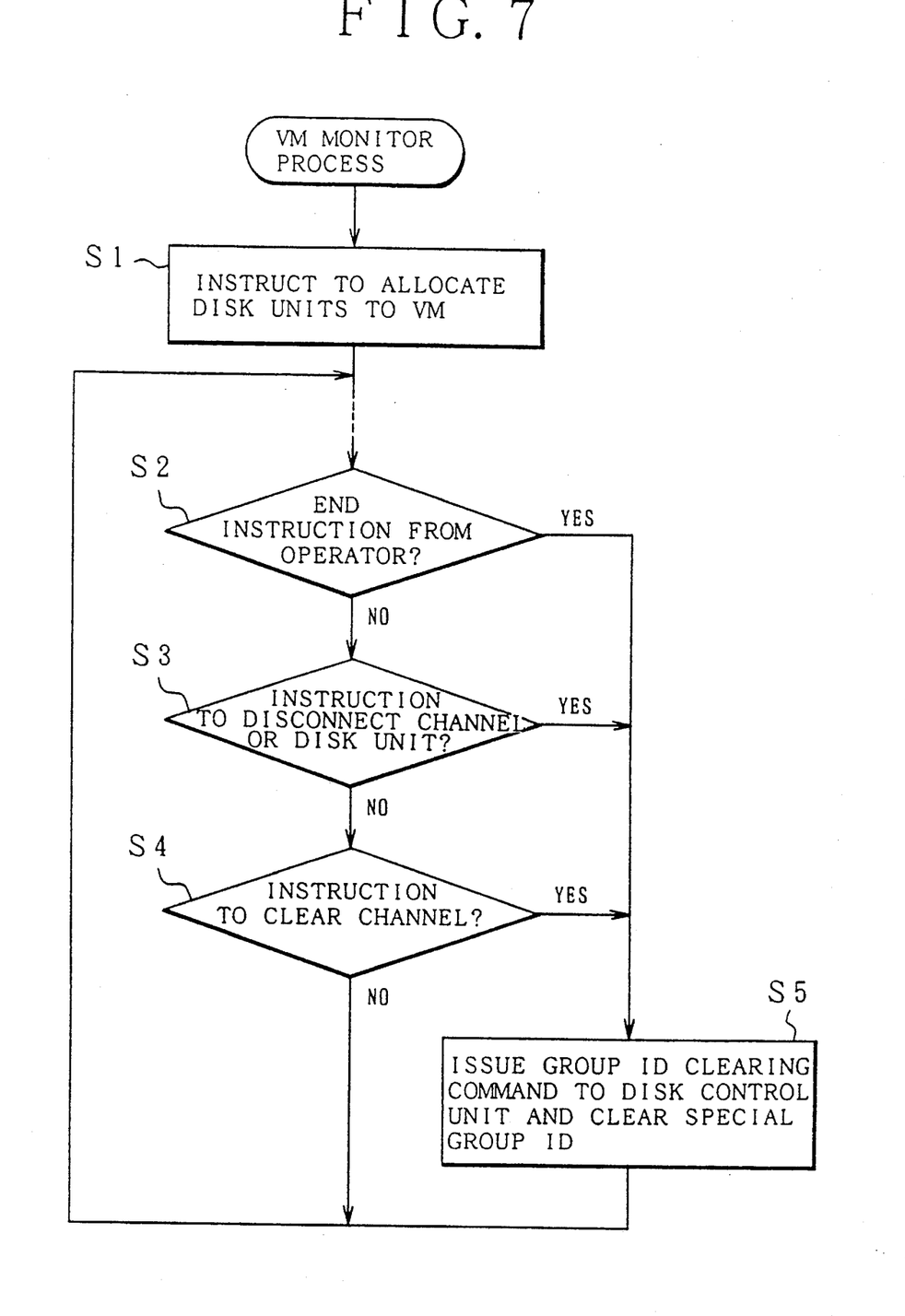
FIG. 7 is a flowchart showing the processing operation of a monitor section in FIG. 4 regarding the input/outputs.

The processing operation of FIG. 4 will now be described. A flowchart of FIG. 7 shows the processing operation of the monitor section 22. When the virtual machine is activated, first, the monitor section 22 allocates the disk units 12-1 and 12-2 to the virtual machines 10-1 and 10-2 in step S1. The start of the operations of the virtual machines 10-1 and 10-2 from the monitor section 22 is subsequently instructed. Specifically speaking, the IPL (Initial Program Load) of the virtual machines 10-1 and 10-2 is instructed by the operator and the operation shown in a flowchart of FIG. 8 is started.

Figure 8:
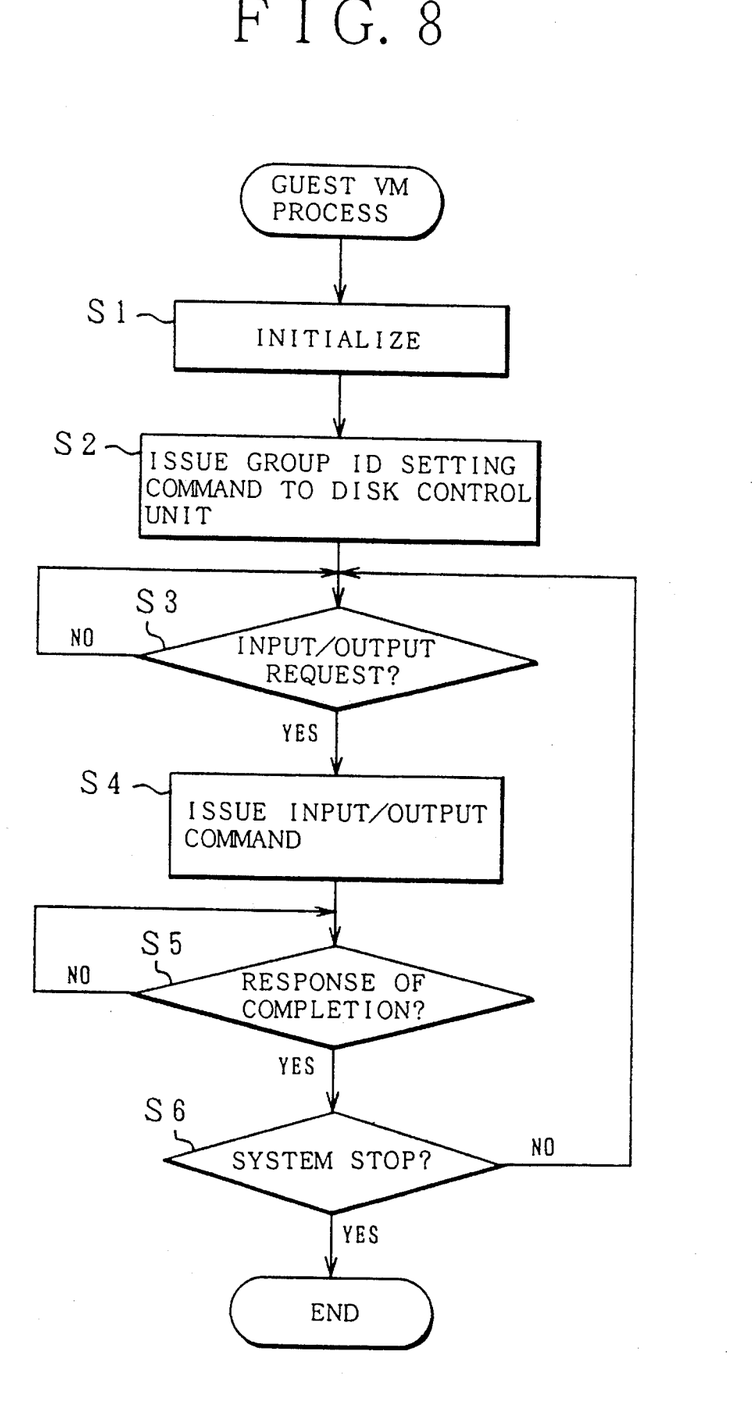
FIG. 8 is a flowchart showing the input/output process of the virtual machine in FIG. 4.
Figure 9:
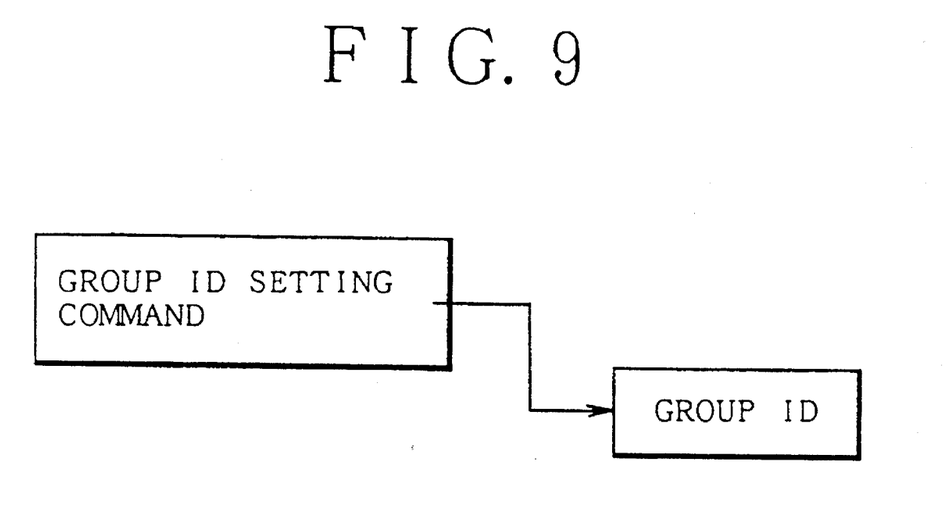
FIG. 9 is an explanatory diagram of a command format of a group ID setting command which is issued from a virtual machine.

In step S2 after completion of the initialization in step S1 in the flowchart of FIG. 8, each of the virtual machines 10-1 and 10-2 issues a group ID setting command to the disk control unit 14 through the channel device 16-1 as a group ID setting process of the operating system (OS) which operates on the virtual machines 10-1 and 10-2. For example, the group ID setting command has a format in which group IDs shown in FIG. 9 are chained.

Subsequently, when the OS which operates on the virtual machine 10-1 or 10-2 discriminates the input/output request to the disk unit 12-1 or 12-2 in step S3, the input/output command is issued to the disk control unit 14 through the channel device 16-1 or 16-2 in step S4. In step S5, the system waits for a response indicative of the completion of the reading or writing operation of the disk unit 12-1 or 12-2 and executes a series of input/output requests. The above processes are continued until the stop of the system such as a stop of the operation or the like is discriminated in step S6. The monitor section 22 is never used for the input/output command of the virtual machine 10-1 or 10-2 as mentioned above. The input/output processes to the disk unit 12-1 using the access paths 111 and 221 designated by the group ID is executed.

In FIG. 7, on the other hand, the monitor section 22 instructs the allocation of the disk units to the virtual machines 10-1 and 10-2 in step S1. After that, a check is made in step S2 to see if the end of the virtual machines 10-1 and 10-2 has been instructed by the operator or not. In step S3, a check is made to see if the removal of the channel or disk unit has been instructed or not. In step S4, a check is further made to see if a reset command of the channel which is issued by the OS exists or not. If YES in either one of the processing steps S2 to S4, the processing routine advances to step S5.

Figure 10:
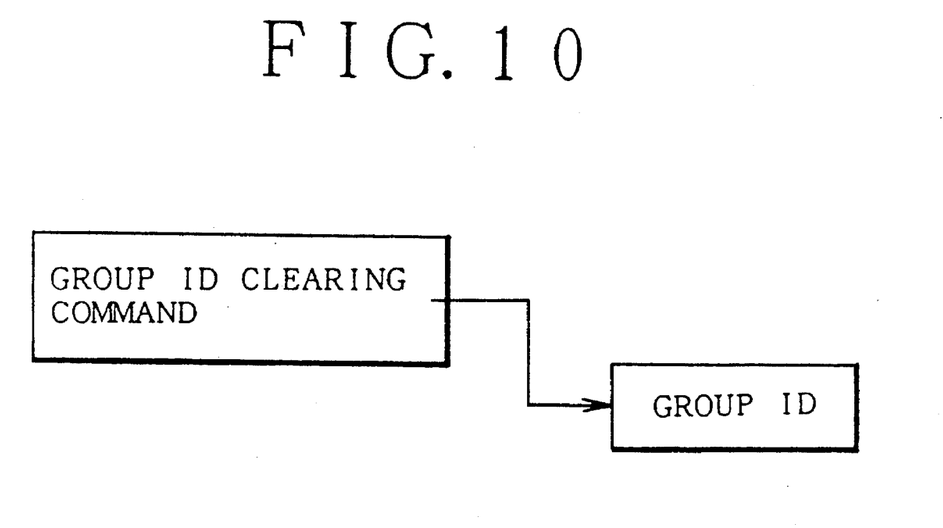
FIG. 10 is an explanatory diagram of a command format of a group ID clearing command which is issued on the basis of the monitor section.

In step S5, the monitor section 22 reads the group ID set by the corresponding virtual machine from the table held every channel adapters 24-1 and 24-2 of the disk control unit 14 and designates the group ID and issues a group ID clearing command to the disk control unit 14. The group ID clearing command has a format in which the group IDs are chained as shown in FIG. 10. By receiving the group ID clearing command, the clearing section 18 of the disk control unit 14 clears the group ID designated by the monitor section 22 from the table.

Figure 11:
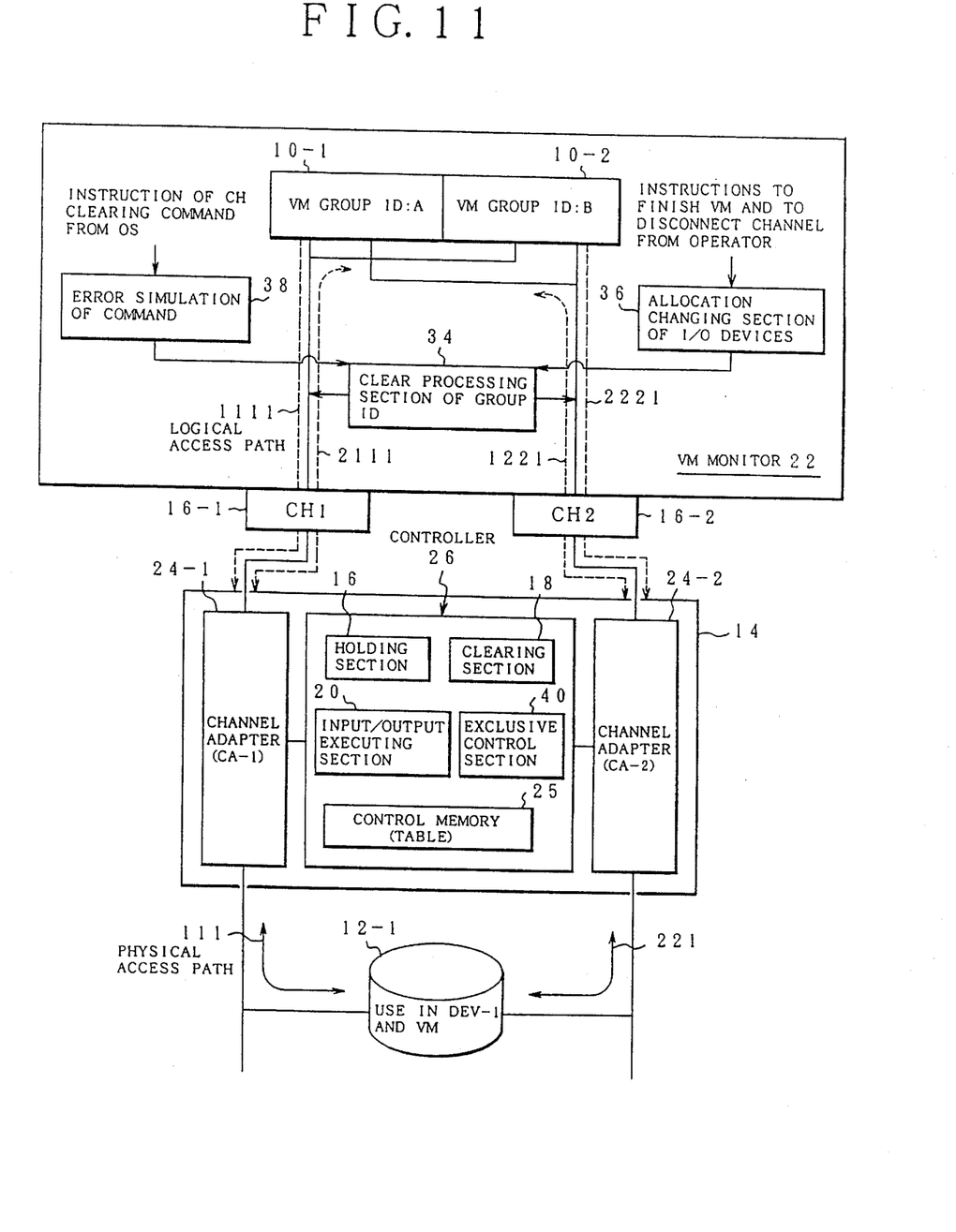
FIG. 11 is an explanatory diagram showing a processing function of the input/output controls according to a modification of the invention.

FIG. 11 shows processing functions of the input/output controls by another format of the invention. FIG. 11 relates to an input/output format in which one disk unit is commonly used by a plurality of virtual machines. Since a hardware of the virtual machine system in this case is similar to that in FIG. 3, the function of each section is shown in FIG. 11 in correspondence to the hardware construction of FIG. 3.

In FIG. 11, the virtual machines 10-1 and 10-2 are realized by a plurality of operating systems which are controlled by the monitor section 22. The group ID=A is allocated to the virtual machine 10-1. The group ID=B is allocated to the virtual machine 10-2. The virtual machines 10-1 and 10-2 are connected to the disk control unit 14 through two physical access paths which pass through the channel devices 16-1 and 16-2.

The channel adapters 24-1 and 24-2 are provided for the disk control unit 14 in correspondence to the two access paths. The disk unit 12-1 is connected by two physical access paths through the channel adapters 24-1 and 24-2.

The disk unit 12-1 is allocated to both of the virtual machines 10-1 and 10-2 and the disk unit 12-1 is commonly used by the virtual machines 10-1 and 10-2. Therefore, with respect to the physical access path 111 which passes through the channel device 16-1 and the channel adapter 24-1 for the disk unit 12-1, the virtual machines 10-1 and 10-2 executes the input/output processes by using logical access paths 1111 and 2111.

In addition to the functions of the holding section 16, clearing section 18, and input/output executing section 20 which are realized by a program control, an exclusive control section 40 to execute an exclusive control when the disk unit 12-1 is commonly used by the two virtual machines 10-1 and 10-2 is further provided for the controller 26 equipped for the disk control unit 14.

In order to enable the exclusive control to be executed for one disk unit 12-1 in response to the input/output request using the logical access paths 1111 and 2111 from the virtual machines 10-1 and 10-2, a table to convert the logical access paths 1111 and 2111 from the virtual machines 10-1 and 10-2 into the corresponding physical path 111 is stored in the control memory 25 of the controller 26.

Therefore, by converting the logical access paths in association with the input/output request from the virtual machine 10-1 or 10-2 into the physical access path with reference to the table, the exclusive control to the disk unit 12-1 which is commonly used can be realized.

Further, the group IDs are set into the table that is developed in the control memory 25 on the basis of the group ID setting command issued from each of the virtual machines 10-1 and 10-2 to the group ID holding section 16. The set group IDs are held every logical access path provided for the table.

In FIG. 11, further, another physical access path 221 which passes through the channel device 16-2 and channel adapter 24-2 is provided as an access path for the disk unit 12-1. With respect to the physical access path 221 side as well, to realize the expansion reserving function and dynamic path recoupling function by the group formation, logical access paths 1221 and 2221 from the virtual machines 10-1 and 10-2 are allocated. The conversion from the logical access paths into the physical access path and the setting of the group IDs of every logical access path are executed for the table in the control memory 25 in a manner similar to the physical access path 111 side.

Figure 12:
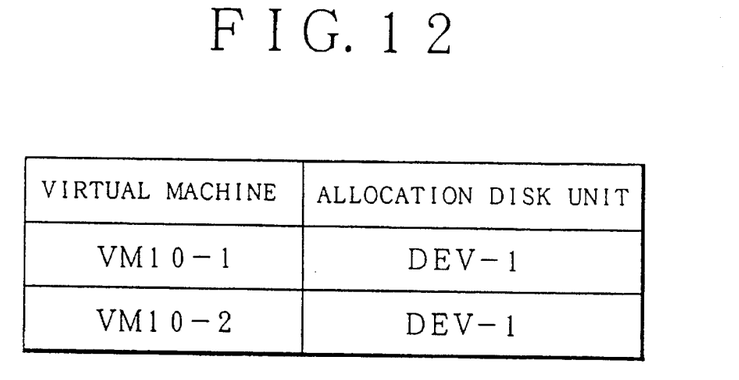
FIG. 12 is an explanatory diagram of the allocation of disk units to virtual machines according to the modification of the invention.

FIG. 12 shows the allocation of the disk unit 12-1 to the virtual machine VM 10-1 in FIG. 11. The disk unit 12-1 shown by the number DEV-1 is allocated to both of the virtual machines 10-1 and 10-2, so that it is commonly used.

Figure 13:
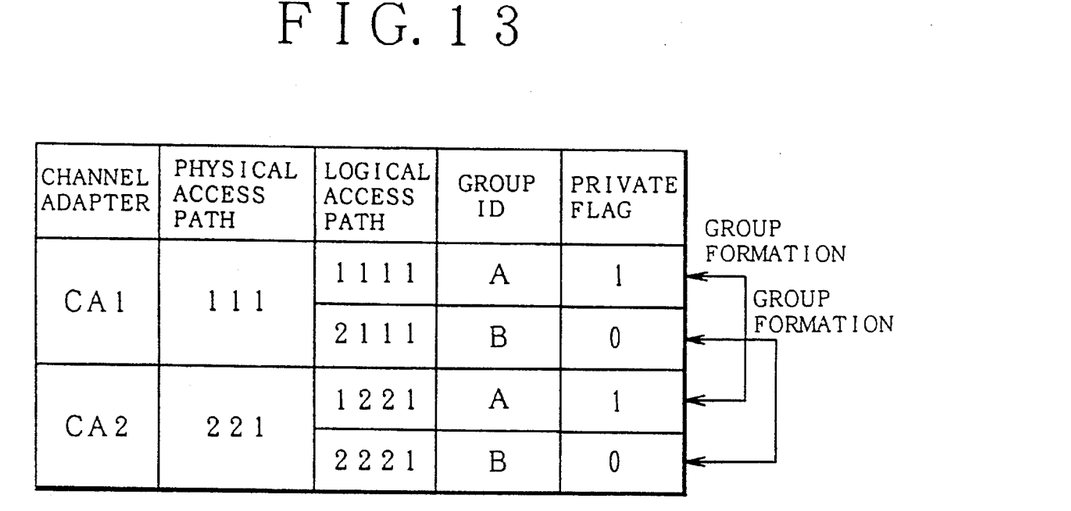
FIG. 13 is an explanatory diagram of a table showing the correspondence between the access paths and the group IDs which is held in a disk control unit in FIG. 11.

FIG. 13 is an explanatory diagram of the table developed in the control memory 25 of the controller 26. The physical access paths 111 and 221 are stored by using the channel adapter numbers CA1 and CA2 which are determined by the channel adapters 24-1 and 24-2 of the disk control unit 14 as indices. The modification of the invention is fundamentally based as a prerequisite on that one physical access path is used and is commonly used by a plurality of virtual machines. Therefore, for example, in case of the physical access path 111 of the channel adapter number CA1, two logical access paths 1111 and 2111 of the virtual machines 10-1 and 10-2 which access the disk unit 12-1 by using the physical access path 111 are stored into the table. Therefore, by referring to the logical access path, the corresponding physical access path can be known.

With regard to the logical access path 1111, the group ID=A is set and there is shown that it is the access path belonging to the virtual machine 10-1. The group ID=B is set for the logical access path 2111 and there is shown that it is the logical access path belonging to the virtual machine 10-2.

The group formation by the group ID is realized by holding the group ID=(A, B) with respect to the logical access paths 1221 and 2221 from the virtual machines 10-1 and 10-2 corresponding to the physical access paths 221 shown by the channel number CA2, respectively. By referring to the table in which the group IDs were held, it is possible to recognize that the logical access paths 1111 and 1221 having the same group ID form the same group and that the logical access paths 2111 and 2221 form another same group.

By the group formation, in a manner similar to the case of FIG. 4, when a reserving command is received, the expansion reserving function to reserve the input/output devices by the access paths having the same group ID can be realized.

In the case where a recoupling request is received after a seeking command was issued and the disk unit 12-1 was disconnected, when the original physical access path is in a busy state, the physical access path corresponding to another logical access path included in the same group is recognized and the dynamic path recoupling function can be realized.

Further, in a table shown in FIG. 13, since two virtual machines execute the input/output operations to one physical access path by using the logical access paths, a private flag is provided in order to indicate a capturing state of the physical access path. When the private flag is set into 1, it is shown that the physical access path is in a using state. When the private flag is reset to 0, it is shown that the physical access path is in a blank state.

After the exclusive control section 40 provided for the controller 26 in FIG. 11 converted the logical access paths into the physical access path, the exclusive control unit 40 checks to see if the private flag has been set or reset and the system captures the physical access path or waits until it is captured.

In the modification of FIG. 11, there is shown the case where one disk unit 12 is commonly used by the two guest virtual machines 10-1 and 10-2 as an example. A plurality of disk units can be also provided.

In the hardware construction of FIG. 2, two channel devices 16-1 and 16-2 have been provided for one disk control unit 14. However, the number of disk control units and the number of channel devices are properly determined in accordance with a scale of the subsystem.

Although the above embodiment has been shown and described with respect to the case where the disk units are used as input/output devices as an example, the invention is not limited to such an example but can be also applied to any other input/output devices such as optical disc unit, magnetic tape device, semiconductor disk unit, and the like.

Although the multiprocessor system has been described as an example, the invention can be also applied to a single processor system. Further, the number of virtual machines which are realized by the monitor section can be also set to an arbitrary number.

According to the invention as mentioned above, since the functions which the input/output control unit has can be provided to a plurality of virtual machines, so that the performance and reliability regarding the execution of the input/output operations of the virtual machines can be improved.

On the other hand, since the interpreting process to the input/output command by the monitor section is unnecessary, the overhead of the monitor section is reduced and the performance of the system can be improved.

What is claimed is:

1. An input/output control method of a virtual machine system, comprising:

an allocating step of allocating either one of a plurality of input/output devices to each of a plurality of virtual machines which are realized on a real machine by a monitor section as a software to control the virtual machine system in a one-to-one corresponding manner;

a group ID holding step of defining access paths, which form logical couplings of a number as many as the number of a plurality of channel devices with respect to one of said input/output devices as access paths, each of which reaches each of said input/output devices via said plurality of virtual machines, said plurality of channel devices, and an input/output control unit on the basis of the result of the allocation in said allocating step, and of holding each group ID set by each of said virtual machines for every access path into a table in said input/output control unit;

an input/output executing step of detecting the access paths belonging to the same group from among said plurality of access paths which reach the input/output device designated by a command with reference to said table and executing input/output operations when an input/output command issued from either one of said plurality of virtual machines is received by said input/output control unit; and a clearing step of clearing a special group ID provided for the input/output control unit by an instruction of said monitor section.

2. A method according to claim 1, wherein in said group ID holding step, said plurality of virtual machines are activated on the basis of the result of the allocation of said plurality of input/output devices by the monitor section and the setting of the group IDs is executed by a group ID setting process of an operating system which operates on each of said virtual machines.

3. A method according to claim 1, wherein in said clearing step, when the allocation of said plurality of input/output devices to each of said virtual machines is changed by said monitor section, a clearing process is instructed to each of the input/output control devices, thereby clearing the group ID used by each of the virtual machines.

4. A method according to claim 1, wherein in said group ID holding step, there is provided a table to set a plurality of said group IDs for each of said plurality of channel devices provided for the input/output control unit.

5. A method according to claim 1, wherein in said input/output executing step, input/output processes are executed by using two or more access paths belonging to the same group detected with reference to said table.

6. A method according to claim 1, wherein said input/output device is a disk unit and said input/output control unit is a disk control unit.

7. An input/output control apparatus of a virtual machine system, comprising:

a plurality of virtual machines which are realized on a real machine by a monitor section as a software to control the virtual machine system and which executes input/output controls by an independent operating system;

a plurality of input/output devices allocated to each of said plurality of virtual machines in a one-to-one corresponding manner;

an input/output control unit coupled to each of said plurality of input/output devices; and at least two channel devices to couple said input/output control unit to said plurality of virtual machines, wherein said input/output control unit has group ID holding means for defining access paths forming logical couplings of a number as many as the number of said channel devices with respect to one of said input/output devices as access paths each of which starts from each of said plurality of virtual machines and reaches each of said plurality of input/output devices via the channel devices and the input/output control unit, and for holding each group ID set by each of said plurality of virtual machines for each of said plurality of access paths into a table, clearing means for clearing a special group ID held in said table of said group ID holding means, and input/output executing means for detecting the access paths belonging to the same group from among said plurality of access paths which reach the input/output device designated by a command with reference to the table in said group ID holding means and for executing input/output operations.

8. An apparatus according to claim 7, wherein said group ID holding means activates each of said plurality of virtual machines on the basis of the result of the allocation of said plurality of input/output devices by said monitor section and is subjected to the setting of the group IDs by a group ID setting process of an operating system which operates on each of said virtual machines.

9. An apparatus according to claim 8, wherein said input/output device is a disk unit and said input/output control unit is a disk control unit.

10. An apparatus according to claim 7, wherein said clearing means of the input/output control unit clears the special group ID by an instruction of the monitor section.

11. An apparatus according to claim 10, wherein when the allocation of said plurality of input/output devices to each of said virtual machines is changed, said monitor section instructs the clearing operation to the clearing means of the input/output control unit in order to clear the group ID used by each of said virtual machines.

12. An apparatus according to claim 7, wherein a table to set a plurality of said group IDs for each of said at least two channel devices is provided for the input/output control unit.

13. An apparatus according to claim 7, wherein said input/output executing means executes input/output processes by using two or more access paths designated by the group ID obtained from the table of said group ID holding means.

14. An input/output control method of a virtual machine system, comprising:

an allocating step of commonly allocating one input/output device which is coupled by a physical access path forming at least one physical coupling and logical access paths forming two logical couplings through channel devices and one input/output control unit to a plurality of virtual machines which are realized on a real machine by a monitor section as a software to control the virtual machine system;

a group ID holding step of holding a corresponding relation between said plurality of logical access paths and said one physical access path and a group ID set by each of said virtual machines every said plurality of logical access paths into a table in said input/output control unit on the basis of the result of said allocation in said allocating step;

an exclusive control step of converting the logical access paths into the physical access path with reference to said table and controlling a competition of the physical access paths when an input/output command issued from either one of said plurality of virtual machines is received by the input/output control unit; and an input/output executing step of executing an input/output command to the input/output devices on the basis of the result of the control in said exclusive control step.

15. A method according to claim 14, wherein in said group ID holding step, each of said plurality of virtual machines is activated on the basis of the result of the allocation of the input/output devices by the monitor section and the setting of the group IDs is executed by a group ID setting process of an operating system which operates on said plurality of virtual machines.

16. A method according to claim 14, further having a clearing step of clearing the group ID of the input/output control unit by an instruction of said monitor section.

17. A method according to claim 16, wherein in said clearing step, when the allocation of the input/output devices to either one of said plurality of virtual machines by the monitor section is changed, the clearing process is instructed to said clearing means of the input/output control unit, thereby clearing the group ID used by each of said virtual machines.

18. A method according to claim 14, wherein in said group ID holding step, a table to set the group IDs for each of said plurality of channel devices is provided.

19. A method according to claim 14, wherein when a plurality of different input/output devices are commonly allocated to each of said virtual machines, in said input/output executing step, the input/output processes are executed by using one or a plurality of physical access paths designated by the group ID obtained from said table.

20. A method according to claim 14, wherein said input/output device is a disk unit and said input/output control unit is a disk control unit.

21. An input/output control apparatus of a virtual machine system, comprising:

a plurality of virtual machines which are realized on a real machine by a monitor section as a software to control the virtual machine system and execute input/output controls by an independent operating system;

one input/output device commonly allocated to said plurality of virtual machines;

an input/output control unit coupled to said input/output device by one physical access path serving as a physical coupling; and at least one channel device which is coupled to said plurality of virtual machines by a plurality of logical access paths serving as logical couplings via said input/output control unit, wherein said input/output control unit has group ID holding means for converting said plurality of logical access paths instructed by an input/output command from each of said plurality of virtual machines into a single physical access path and for holding each group ID set by each of said virtual machines into a table for each of said plurality of logical access paths which start from said plurality of virtual machines and reach said input/output devices, clearing means for clearing a special group ID held in the table of said group ID holding means, exclusive control means for converting the logical access paths designated by the input/output command into the physical access path with reference to the table of the group ID holding means and for controlling a competition of the accesses, and input/output executing means for executing the input/output commands to the input/output devices on the basis of the result of the control of said exclusive control means.

22. An apparatus according to claim 21, wherein said group ID holding means provided for said input/output control unit activates each of said plurality of virtual machines on the basis of the result of the allocation of the special input/output device by said monitor section and is subjected to the setting of the group ID by a group ID setting process of an operating system which operates on said plurality of virtual machines.

23. An apparatus according to claim 21, wherein said clearing means of the input/output control unit clear the special group ID by an instruction of the monitor section.

24. An apparatus according to claim 23, wherein when the allocation of the input/output devices to either one of said virtual machines is changed, said monitor section instructs the clearing process to said clearing means of the input/output control unit in order to clear the group ID used by each of said virtual machines.

25. An apparatus according to claim 21, wherein a table, to set a plurality of said group IDs for each of said plurality of channel devices, is provided for said input/output control means.

26. An apparatus according to claim 21, wherein when said plurality of input/output devices are allocated to each of said plurality of virtual machines, said input/output executing means executes input/output processes by using two or more physical access paths having the same group ID obtained from the table of the group ID holding means.

27. An apparatus according to claim 21, wherein said input/output device is a disk unit and said input/output control unit is a disk control unit.

* * * * *